United States Patent
Sarashina (10) Patent No.: US 9,112,610 B2
(45) Date of Patent: Aug. 18, 2015

(54) OPTICAL NETWORK UNIT REGISTRATION METHOD

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 64 days.

(21) Appl. No.: 13/789,886

(22) Filed: Mar. 8, 2013

(65) Prior Publication Data

US 2013/0259482 A1  Oct. 3, 2013

(30) Foreign Application Priority Data

Mar. 29, 2012  (JP) .................................. 2012-077262

(51) Int. Cl.
| | |
|---|---|
| *H04J 14/00* | (2006.01) |
| *H04B 10/00* | (2013.01) |
| *H04B 10/27* | (2013.01) |
| *H04B 10/272* | (2013.01) |
| *H04J 14/02* | (2006.01) |

(52) U.S. Cl.
CPC .............. *H04B 10/27* (2013.01); *H04B 10/272* (2013.01); *H04J 14/025* (2013.01); *H04J 14/0246* (2013.01); *H04J 14/0254* (2013.01); *H04J 14/0267* (2013.01); *H04J 14/0282* (2013.01); *H04J 14/0247* (2013.01); *H04J 14/0252* (2013.01)

(58) Field of Classification Search
USPC ................................................ 398/167.5, 67
See application file for complete search history.

(56) References Cited

U.S. PATENT DOCUMENTS

| 8,086,872 B2* | 12/2011 | Kim et al. ...................... 713/191 |
|---|---|---|
| 2005/0249500 A1* | 11/2005 | Liaw et al. ...................... 398/70 |
| 2006/0171715 A1* | 8/2006 | Miyata et al. ................... 398/72 |
| 2006/0257149 A1* | 11/2006 | Hirth et al. ...................... 398/72 |
| 2007/0025352 A1* | 2/2007 | Tanaka .......................... 370/390 |
| 2007/0133800 A1* | 6/2007 | Kim et al. ...................... 380/256 |
| 2008/0037981 A1* | 2/2008 | Mukojima ...................... 398/10 |
| 2008/0304828 A1* | 12/2008 | Mizutani et al. ................ 398/78 |
| 2009/0185804 A1* | 7/2009 | Kai et al. ........................ 398/48 |
| 2009/0263122 A1* | 10/2009 | Helkey et al. ...................... 398/7 |
| 2010/0178051 A1* | 7/2010 | Mizutani et al. ................ 398/25 |
| 2012/0315040 A1* | 12/2012 | Dahlfort et al. ................ 398/58 |
| 2013/0183039 A1* | 7/2013 | Hood et al. ...................... 398/72 |
| 2014/0050479 A1* | 2/2014 | Luo et al. ........................ 398/68 |

FOREIGN PATENT DOCUMENTS

JP          2010-278525 A     12/2010

* cited by examiner

*Primary Examiner* — Kenneth Vanderpuye
*Assistant Examiner* — Abbas H Alagheband
(74) *Attorney, Agent, or Firm* — Rabin & Berdo, P.C.

(57) ABSTRACT

In a network that includes one or a plurality of optical line terminals, a plurality of branches, and an optical routing unit, the optical network unit registration method includes a first process in which the optical line terminals transmit a discovery gate to the optical network units, and a second process in which, in response to the discovery gate, an unregistered optical network unit transmits a register request to a separate optical line terminal from the terminal that transmitted the discovery gate. A discovery window is provided in the optical line terminal that receives the register request. This optical line terminal receives the register request in the discovery window.

5 Claims, 7 Drawing Sheets

FIG.2

| OPTICAL LINE PORT | WAVELENGTH | OPTICAL NETWORK PORT |
|---|---|---|
| 1 | $\lambda 1$ | 1 |
| 1 | $\lambda 2$ | 2 |
| 1 | $\lambda 3$ | 3 |
| 1 | $\lambda 4$ | 4 |
| 2 | $\lambda 1$ | 2 |
| 2 | $\lambda 2$ | 3 |
| 2 | $\lambda 3$ | 4 |
| 2 | $\lambda 4$ | 1 |
| 3 | $\lambda 1$ | 3 |
| 3 | $\lambda 2$ | 4 |
| 3 | $\lambda 3$ | 1 |
| 3 | $\lambda 4$ | 2 |
| 4 | $\lambda 1$ | 4 |
| 4 | $\lambda 2$ | 1 |
| 4 | $\lambda 3$ | 2 |
| 4 | $\lambda 4$ | 3 |

| BRANCH | ALL ONU REGISTRATION |
|--------|----------------------|
| 1 | NOT YET |
| 2 | COMPLETED |
| 3 | NOT YET |
| 4 | NOT YET |

OPTICAL NETWORK UNIT REGISTRATION METHOD

CROSS REFERENCE TO RELATED APPLICATION

This application is based upon and claims benefit of priority from Japanese Patent Application No. 2012-077262, filed on Mar. 29, 2012, the entire contents of which are incorporated herein by reference.

BACKGROUND

The present invention relates to an optical network unit registration method in a network configured from a plurality of optical line terminals and a plurality of branches including an optical network unit.

A communications network linking a building (station) owned by a communications operator and a subscriber's home is called an access network. In response to the increases in communication capacity of recent years, optical access networks that enable the transmission of very large amounts of information by utilizing optical communication are becoming mainstream.

One example of an optical access network is a passive optical network (PON). A PON is configured from one optical line terminal (OLT) provided in the station, a plurality of optical network units (ONU) respectively provided in subscribers' homes, and an optical splitter. The OLT, ONUs, and the optical splitter are connected by an optical fiber.

A single optical fiber is used for the connection between the OLT and the splitter. This single optical fiber is shared by a plurality of ONUs. Further, the optical splitter is a low-cost passive element. Thus, PONs have excellent economic performance, and they are also easy to maintain. Consequently, the introduction of PONs is rapidly proceeding.

In a PON, the signals transmitted from the respective ONUs to the OLT (hereinafter, sometimes referred to as "uplink optical signals") are multiplexed by the optical splitter, and transmitted to the OLT. On the other hand, the signals transmitted from the OLT to the respective ONUs (hereinafter, sometimes referred to as "downlink optical signals") are demultiplexed by the optical splitter, and transmitted to the respective ONUs. Further, to prevent interference between the uplink optical signals and the downlink optical signals, the uplink optical signals and the downlink optical signals are allocated respectively different wavelengths.

Further, in PONs, various multiplexing technologies are used. Examples of multiplexing technologies used in PONs include time division multiplexing (TDM), in which short time divisions on the time axis are allocated to each subscriber, wavelength division multiplexing (WDM), in which different wavelengths are allocated to each subscriber, code division multiplexing (CDM), in which different codes are allocated to each subscriber and the like. Among these multiplexing technologies, a TDM-PON utilizing TDM is currently the most widely used.

In a TDM-PON, TDMA (time division multiple access) is used. TDMA is a technology in which the OLT controls so that uplink optical signals from different ONUs do not collide with each other by managing the transmission timing from each ONU.

A PON system that uses Ethernet® technology is called Ethernet®-PON, and a system that uses Gigabit (1×109 bit/sec) Ethernet® technology is called GE-PON. GE-PON is standardized by IEEE 802.3ah.

In a GE-PON system, to perform communication between the OLT and an ONU, the ONU has to be registered in the OLT. In a GE-PON system, since a plurality of ONUs are connected, registration of a new ONU needs to be performed without affecting communication between the other registered ONUs and the OLT. Consequently, the above-mentioned IEEE 802.3ah (hereinafter referred to as the "standard") stipulates the procedure for detecting and registering an unregistered ONU by the OLT (hereinafter referred to as a "discovery sequence").

The OLT periodically broadcasts a discovery gate. A discovery gate is transmitted to all the ONUs regardless of whether the ONU is registered or not. When an ONU newly connected to the PON system is turned on and is capable of receiving signals, it periodically receives a discovery gate.

When an unregistered ONU receives a discovery gate, the ONU transmits a register request to the OLT requesting registration. The register request includes a MAC address as an individual identification number of each ONU.

On the other hand, at the OLT, a discovery window is set. During the period that this discovery window is open, the OLT waits for reception of a register request.

When the OLT receives a register request, the OLT recognizes the ONU MAC address. The OLT then transmits a register to the ONU that has the recognized MAC address. The register includes a link number (LLID) for the PON system.

After transmitting the register, the OLT notifies the transmission band and the transmission timing, and transmits a gate permitting transmission of uplink optical signals to the ONU.

The ONU that received the gate transmits a register acknowledgement (ACK) to the OLT. When the OLT receives the register acknowledgement, the ONU registration is complete. Namely, the discovery sequence is finished (e.g., refer to JP 2010-278525A).

After the ONU is registered, normal OLT-ONU communication is performed.

Normally, in a PON system, one OLT manages a branched optical transmission path and one PON branch that includes the ONUs connected to a branch destination of this optical transmission path. For example, if there are only a few ONUs included on one PON branch, the OLT is shared among few ONUs, which is expensive. Therefore, when there is only a few ONUs on a PON branch, it is desirable if one OLT manages a plurality of PON branches.

To achieve this, a PON system has been proposed that enables a plurality of PON branches to be managed by one OLT by using TDM and WDM together (hereinafter referred to as a "TDM/WDM-PON".

A TDM/WDM-PON is configured from one or a plurality of OLTs, an optical routing unit, and a plurality of PON branches connected to the OLT(s) via the optical routing unit.

The optical routing unit has a plurality of optical communication ports. The plurality of optical communication ports are divided into a first group connected to the OLT, and a second group connected to the optical transmission path of a PON branch. An optical signal input to an optical communication port of one of the groups is output from an optical communication port of the other group determined based on the wavelength of that optical signal.

By having such a configuration, in the TDM/WDM-PON, one OLT can transmit downlink optical signals to different PON branches by changing the transmission wavelength of the downlink optical signals. Further, the ONUs can transmit an uplink optical signal to a specific OLT by transmitting an uplink optical signal having a wavelength instructed from the OLT. Consequently, one OLT can communicate with an arbitrary PON branch configuring the TDM/WDM-PON.

SUMMARY

During the period that the above-described discovery window is open, the OLT stops normal communication, and does not receive uplink data from ONUs. Consequently, communication efficiency deteriorates between an OLT performing a discovery sequence and the ONUs.

According to an embodiment of the present invention, there is provided, in a TDM/WDM-PON, an optical network unit registration method that is capable of performing a discovery sequence without causing a deterioration in communication efficiency.

Thus, the optical network unit registration method according to an embodiment of the present invention includes the following features.

That is, an optical network unit registration method of the present invention includes the following processes to be performed in a network that includes a plurality of OLTs, a plurality of branches, each of which includes a branched optical transmission path and an ONU connected to a branch destination of the optical transmission path, and an optical routing unit, which has a plurality of optical communication ports that are divided into a first group connected to the OLTs and a second group connected to the optical transmission paths of the branches, and which is configured to output an optical signal input to an optical communication port of one of the groups from an optical communication port of the other group that is determined based on a wavelength of the optical signal.

In the first process, the OLT transmits a response request signal as a downlink optical signal to the ONU. Next, in a second process, in response to the response request signal, an unregistered ONU transmits a response signal as an uplink optical signal to a separate OLT from the OLT that transmitted the response request signal. A response reception expectation period is set in the OLT receiving the response signal, and the OLT receives the response signal during the response reception expectation period.

Preferably, in the first process, the OLT transmits a response request signal as a downlink optical signal, and in a second process, an unregistered ONU transmits a response signal as an uplink optical signal. A response reception expectation period is set in the OLT receiving the response signal, and this OLT receives the response signal during the response reception expectation period. During a response reception expectation period set for each branch, the OLT receiving the response signal receives a response signal from the unregistered ONU belonging to the each branch.

In the optical network unit registration method according to an embodiment of the present invention, as described above, a response reception expectation period is set in a separate OTL from the OLT that transmitted the response request signal, and a response signal is received during this response reception expectation period. Consequently, a response reception expectation period is not set in the OLT that transmitted the response request signal. By applying the above-described discovery sequence, the OLT that transmitted the response request signal can receive an uplink optical signal without stopping communication even after transmission of the response request signal. Therefore, the discovery sequence can be carried out without causing a deterioration in communication efficiency.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted. Further, it should be understood by those skilled in the art that various changes and alterations may be made without departing from the spirit and scope of the appended claims.

(TDM/WDM-PON)

A TDM/WDM-PON is used in the optical network unit registration method according to an embodiment of the present invention. First, the configuration of the TDM/WDM-PON will be described with reference to FIG. 1.

Figure 1:
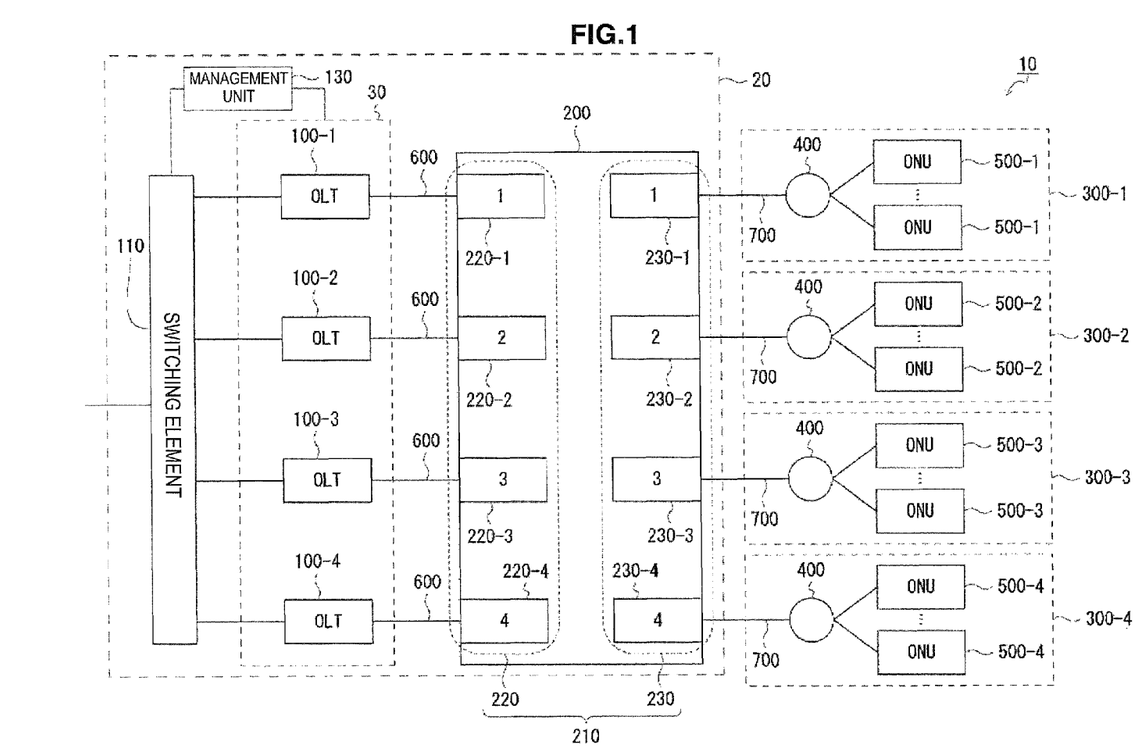
FIG. 1 is a schematic configuration diagram of a TDM/WDM-PON.

A TDM/WDM-PON 10 includes a plurality of OLTs 100 and an optical routing unit 200 that are provided in a station 20, and a plurality of PON branches (hereinafter also simply referred to as branches) 300. The OLTs 100 and the optical routing unit 200 are connected by an optical transmission path 600 configured from an optical fiber.

Each branch 300 includes an optical transmission path 700 configured from an optical fiber, an optical splitter 400, and an ONU 500, respectively. The optical transmission path 700 is connected to the optical routing unit 200. Further, the optical transmission path 700 is split by the optical splitter 400. An ONU 500 is connected to each branch destination of the optical transmission path 700. The ONUs 500 are installed in subscribers' homes, for example.

Further, the TDM/WDM-PON 10 includes a switching element 110 and a management unit 130 in the station 20.

In the configuration example illustrated in FIG. 1, the optical routing unit 200 is arranged in the station 20. However, the optical routing unit 200 can be arranged externally from the station 20. Further, in FIG. 1, although a configuration example having four OLTs 100-1 to 100-4 and branches 300-1 to 300-4 is illustrated, the number of OLTs 100 and branches 300 is not limited.

The OLTs 100 generate a downlink data signal received from a higher network and a downlink control signal for managing the ONUs 500 as downlink optical signals, and transmit the generated signals to the ONUs 500. On the other hand, the ONUs 500 generate an uplink data signal received from a user terminal and an uplink control signal for requesting bandwidth as uplink optical signals, and transmit the generated signals to the OLTs 100. The configuration and the function of the OLTs 100 and the ONUs 500 will be described below.

The optical routing unit 200 is an arrayed waveguide grating router (AWGR) in which optical wavelength filters are arrayed. The optical routing unit 200 has a plurality of optical communication ports 210 capable of inputting/outputting optical signals.

The plurality of optical communication ports 210 are divided into a first group connected to the OLTs 100 via the optical transmission path 600, and a second group connected to the optical transmission path 700 of the branches 300. The optical routing unit 200 outputs an optical signal input to an optical communication port of one of the groups from an optical communication port of the other group that is determined based on the wavelength of the optical signal.

In the following description, an optical communication port 220 included in the first group is also referred to as an "optical line port 220". Further, an optical communication port 230 included in the second group is also referred to as an "optical network port 230". In the configuration illustrated in FIG. 1, first to fourth optical line ports 220-1 to 220-4 are connected on a one-to-one basis to first to fourth OLTs 100-1 to 100-4, respectively. Further, first to fourth optical network ports 230-1 to 230-4 are connected on a one-to-one basis to first to fourth branches 300-1 to 300-4, respectively.

Here, in the AWGR configuring the optical routing unit 200, a wavelength $\lambda$ serving as the standard and a wavelength $\lambda+\lambda_{FSR}$ separated from $\lambda$ by an integral multiple of $\lambda_{FSR}$ are treated as the same wavelength (n is an integer other than 0). This characteristic is called AWGR cyclicity, and $\lambda_{FSR}$ is called free spectral range. Therefore, in the AWGR, when an optical signal with a wavelength that satisfies the above relationship is input to a given optical communication port of one of the groups, the optical signal is output from an optical communication port of the other group determined based on the wavelength $\lambda$.

Figure 2:
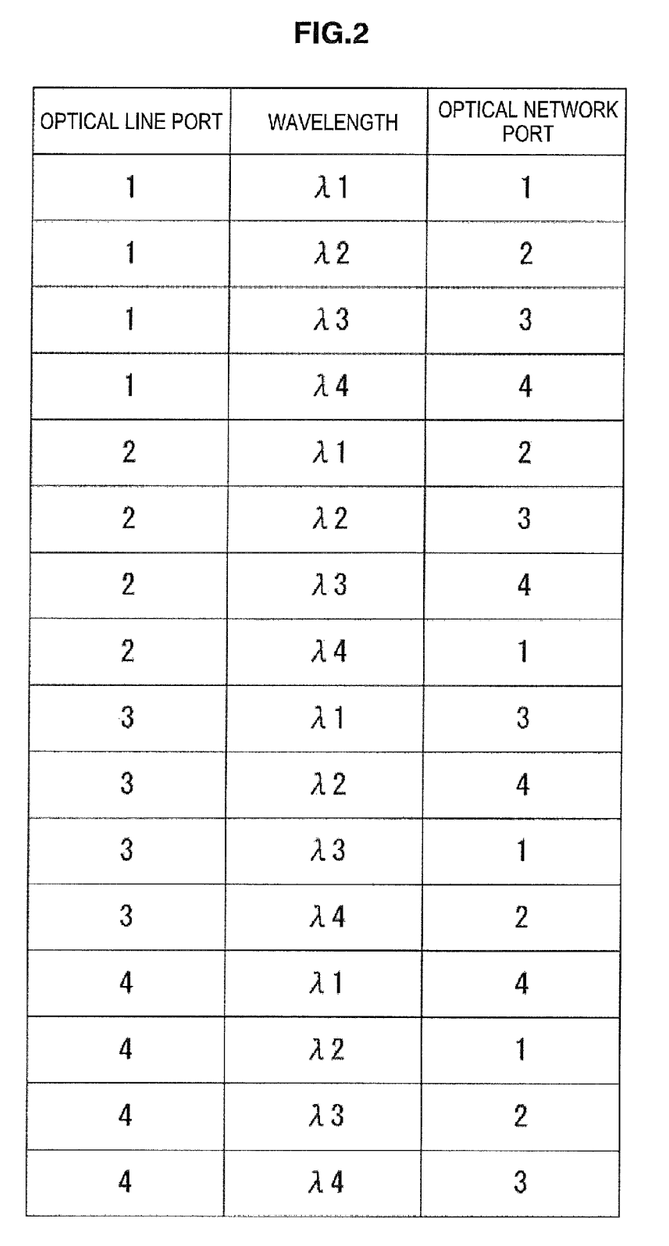
FIG. 2 is a diagram illustrating an example of a relationship between uplink optical signal and downlink optical signal wavelength and an optical communication port in an optical routing unit.

FIG. 2 illustrates an example of a relationship between uplink optical signal and downlink optical signal wavelength and each number of the input/output optical line ports 220 and optical network ports 230.

In the present embodiment, as illustrated FIG. 2, a downlink optical signal input to the optical line port 220 is set to any of $\lambda 1$ to $\lambda 4$, and an uplink optical signal input to the optical network port 230 is set to a value obtained by adding $n\lambda_{FSR}$ to each of the wavelengths $\lambda 1$ to $\lambda 4$.

For example, a downlink optical signal input with a wavelength $\lambda 1$ input to a first optical line port 220-1 is output from a first optical network port 230-1, and an uplink optical signal input with a wavelength $\lambda 1+n\lambda_{FSR}$ input to the first optical network port 230-1 is output from the first optical line port 220-1. Further, a downlink optical signal input with a wavelength $\lambda 2$ input to a first optical line port 220-1 is output from a second optical network port 230-2, and an uplink optical signal input with a wavelength $\lambda 2+n\lambda_{FSR}$ input to the second optical network port 230-2 is output from the first optical line port 220-1.

As already described above, the first to fourth first optical line ports 220-1 to 220-4 are connected on a one-to-one basis to first to fourth OLTs 100-1 to 100-4, respectively, and the first to fourth optical network ports 230-1 to 230-4 are connected on a one-to-one basis to first to fourth branches 300-1 to 300-4, respectively. Therefore, each OLT 100 can select one branch from among the plurality of branches 300 and transmit a downlink optical signal by changing the wavelength of the downlink optical signal. Further, each ONU 500 can select one OLT from among the plurality of OLTs 100 and transmit a respective uplink optical signal by changing the wavelength of the uplink optical signal.

The management unit 130 manages the ONUs 500 for which a PON link has been established, and information about the branches 300 (PON link information) to which those ONUs 500 belong. The management unit 130 is stored in a (not illustrated) storage unit, such as a RAM (random access memory), in a readable/writable manner.

Further, the management unit 130 grasps the communication state of each OLT 100. Therefore, for example, when a given OLT 100 performs the above-described discovery sequence, when the discovery gate is transmitted, the management unit 130 can grasp the other OLTs 100 having a lower amount of communication than that OLT 100 or that are not performing communication (including those in sleep mode). Further, in the below-described optical network unit registration method, the management unit 130 sets a discovery window for the OLTs 100 having a low communication amount or that are not performing communication.

In addition, the management unit 130 produces a transmission plan based on information such as the address and the traffic received from the switching element 110, and PON link information. Based on the transmission plan, the management unit 130 generates a wavelength setting signal. The management unit 130 notifies the switching element 110 and each OLT 100 of the transmission plan. The wavelength setting signal is transmitted to the OLTs 100.

The switching element 110 sets a communication path between a higher network and each OLT 100. Based on the transmission plan notified from the management unit 130, the switching element 110 allocates downlink data signals to the respective OLTs 100, and sends the uplink data signals transmitted from each OLT 100 to the higher network. Further, the switching element 110 notifies the management unit 130 of information such as the downlink data signal address and traffic transmitted from the higher network.

(Optical Line Terminal)

Figure 3:
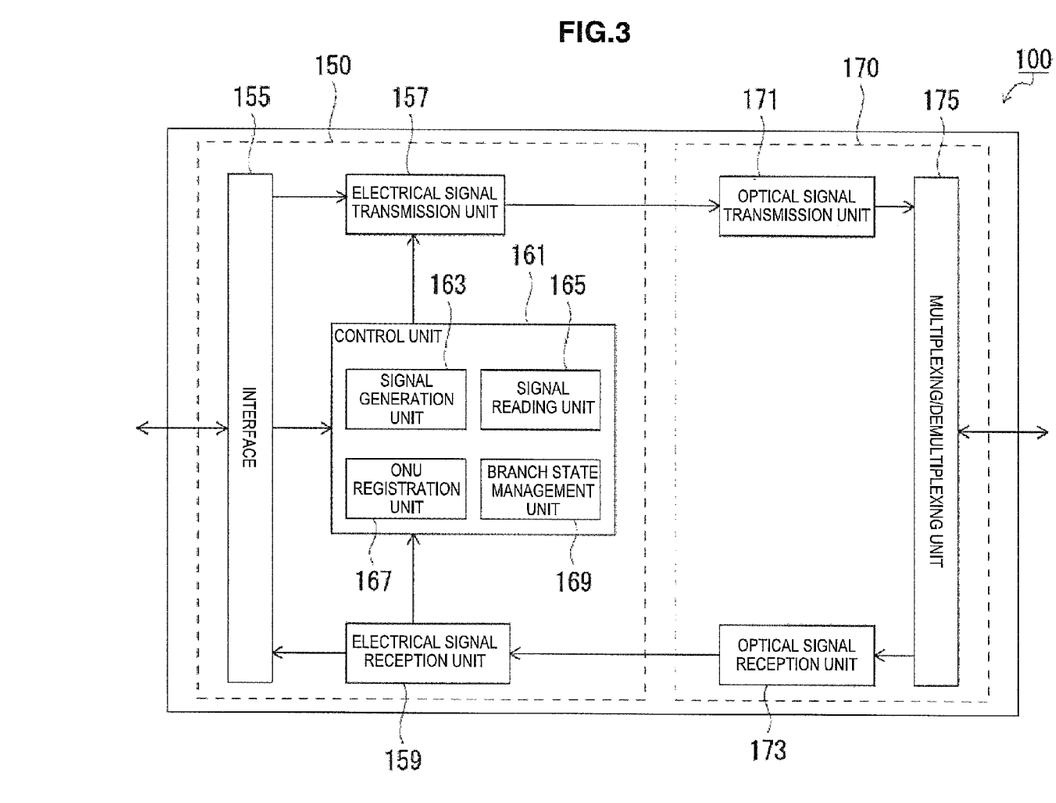
FIG. 3 is a schematic configuration diagram of an OLT.

The configuration of the OLTs 100 will now be described with reference to FIG. 3. In the present embodiment, the OLTs 100 includes an electrical signal processing unit 150 and an optical signal processing unit 170. The electrical signal processing unit 150 includes an interface 155, an electrical signal transmission unit 157, an electrical signal reception unit 159, and a control unit 161. The optical signal processing unit 170 includes an optical signal transmission unit 171, an optical signal reception unit 173, and an multiplexing/demultiplexing unit 175.

Since the interface 155, the electrical signal transmission unit 157, and the electrical signal reception unit 159 can be configured in the same manner as an arbitrary suitable related-art OLT, a detailed description thereof will be omitted here.

The interface 155 transmits and receives uplink data signals and downlink data signals to/from a higher network via the switching element 110.

The electrical signal transmission unit 157 generates a downlink electrical signal based on a downlink data signal received from the interface 155 and a downlink control signal received from the control unit 161. The downlink electrical signal is transmitted to the optical signal transmission unit 171.

The electrical signal reception unit 159 separates the uplink electrical signal received from the optical signal reception unit 173 into an uplink data signal and an uplink control signal. The uplink data signal is transmitted to a higher network via the interface 155 and the switching element 110. The uplink control signal is transmitted to the control unit 161.

The control unit 161 includes, as functional units, a signal generation unit 163, a signal reading unit 165, an ONU registration unit 167, and a branch state management unit 169. The control unit 161 can be configured in the same manner as a related-art OLT. Each of these functional units is realized by a program that is executed by the control unit 161. Further, the processing results and the like of each functional unit are appropriately stored in a (not illustrated) storage unit, such as a RAM.

The signal generation unit 163 generates a downlink control signal. Examples of downlink control signals include a signal instructing an uplink optical signal transmission band to an ONU and the transmission timing based on the transmission plan received from the management unit 130 and the required bandwidth received from the ONU, a discovery gate used in the discovery sequence and the like. In the present embodiment, so that the OLTs 100 can communicate with the plurality of branches 300, the downlink control signal also includes information instructing the transmission wavelength of the uplink optical signal. The downlink control signal is transmitted to the electrical signal transmission unit 157.

The signal reading unit 165 reads information about each ONU, such as a MAC address or required bandwidth, included in the uplink control signal.

The ONU registration unit 167 registers which of the plurality of branches 300 an ONU 500 for which a PON link is established belongs to. Further, the ONU registration unit 167 notifies the management unit 130 via the switching element 110 of the PON link information indicating which branch 300 includes the ONUs 500 with which its own OLT has established a PON link.

The branch state management unit 169 will be described below.

The optical signal transmission unit 171 converts a downlink electrical signal into a downlink optical signal. The optical signal transmission unit 171 has an arbitrary suitable electrical/optical conversion unit capable of changing wavelength, such as a TLD (tunable laser diode). The optical signal transmission unit 171 sets the downlink optical signal to a wavelength that is based on the branch 300 to which the ONU 500 that the signal is to be transmitted to belongs, based on a wavelength setting signal transmitted from the management unit 130. The downlink optical signal is transmitted to the optical routing unit 200 via the multiplexing/demultiplexing unit 175.

The optical signal reception unit 173 converts an uplink optical signal transmitted via the multiplexing/demultiplexing unit 175 into an uplink electrical signal. The optical signal reception unit 173 includes an arbitrary suitable photoelectric conversion element, such as a PD (photo diode), for example. The PD is set so that it can at least receive uplink optical signals in a wavelength band that can be set by the ONUs 500. The uplink electrical signals are transmitted to the electrical signal reception unit 159.

The multiplexing/demultiplexing unit 175 transmits downlink optical signals generated by the optical signal transmission unit 171 to the optical routing unit 200, and transmits uplink optical signals received from the optical routing unit 200 to the optical signal reception unit 173. The multiplexing/demultiplexing unit 175 includes an arbitrary suitable multiplexer/demultiplexer, such as a WDM filter, for example. As already described above, in the present embodiment, light in the λ1 to λ4 wavelength bands is used for the downlink optical signals, and light in the λ1+nλ$_{FSR}$ to λ4+nλ$_{FSR}$ wavelength bands is used for the uplink optical signals. Consequently, by utilizing a WDN filter for example, uplink optical signals and downlink optical signals can be multiplexed and demultiplexed.

(Optical Network Unit)

The configuration of the ONUs 500 will now be described with reference to FIG. 4.

Figure 4:
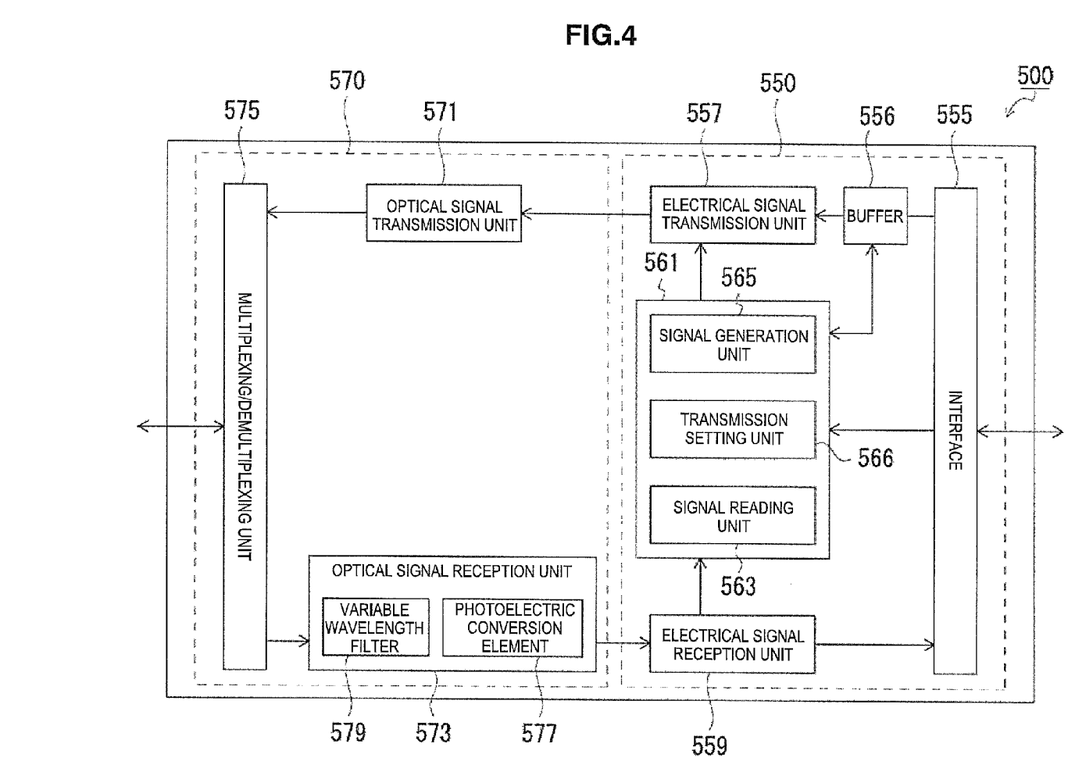
FIG. 4 is a schematic configuration diagram of an ONU.

As illustrated in FIG. 4, in the present embodiment, the ONUs 500 include an electrical signal processing unit 550 and an optical signal processing unit 570.

The electrical signal processing unit 550 includes an interface 555, a buffer unit 556, an electrical signal transmission unit 557, an electrical signal reception unit 559, and a control unit 561. The optical signal processing unit 570 includes an optical signal transmission unit 571, an optical signal reception unit 573, and an multiplexing/demultiplexing unit 575.

Since the interface 555, the buffer unit 556, the electrical signal transmission unit 557, and the electrical signal reception unit 559 can be configured in the same manner as an arbitrary suitable related-art ONU, a detailed description thereof will be omitted here.

The interface 555 transmits and receives uplink optical signals and downlink optical signals to/from a user terminal.

The buffer 556 stores uplink optical signals transmitted from the interface 555. The buffer 556 notifies the control unit 561 of the stored data amount (buffer amount), reads an uplink data signal in response to an instruction from the control unit 561, and transmits the read uplink data signal to the electrical signal transmission unit 557.

The electrical signal transmission unit 557 generates an uplink electrical signal based on the uplink data signal received from the buffer 556 and the uplink control signal received from the control unit 561. Then, the electrical signal transmission unit 557 transmits the uplink electrical signal to the optical signal transmission unit 571.

The electrical signal reception unit 559 separates the downlink electrical signal into a downlink data signal and a downlink control signal. The downlink data signal is transmitted to the user terminal via the interface 555. The downlink control signal is transmitted to the control unit 561.

The control unit 561 includes a signal reading unit 563, a signal generation unit 565, and a transmission setting unit 566.

The signal reading unit 563 reads the information that may be necessary to perform communication with an OLT, such as information indicating the uplink optical signal transmission bandwidth, the transmission timing, and the transmission wavelength, included in the downlink control signal.

The signal generation unit 565 generates an uplink control signal that notifies an OLT 100 of the buffer amount read from the buffer unit 556, for example. The uplink control signal is transmitted to the electrical signal transmission unit 557.

The transmission setting unit 566 notifies the optical signal transmission unit 571 via the electrical signal transmission unit 557 of the uplink optical signal wavelength and the transmission timing, for example, read by the signal reading unit 563.

The optical signal transmission unit 571 converts the uplink electrical signal into an uplink optical signal. The optical signal transmission unit 571 has an arbitrary suitable electrical/optical conversion unit capable of changing the wavelength, such as a TLD. The uplink optical signal is set based on a notification from the transmission setting unit 566. Then, the uplink optical signal generated by the optical signal transmission unit 571 is transmitted via the multiplexing/demultiplexing unit 575 to the OLT 100.

The optical signal reception unit 573 converts the downlink optical signal transmitted via the multiplexing/demultiplexing unit 575 into a downlink electrical signal. The downlink electrical signal is transmitted to the electrical signal reception unit 559. The optical signal reception unit 573 includes an arbitrary suitable photoelectric conversion element 577, such as a PD, for example. The PD is set so that it can at least receive downlink optical signals in a wavelength band that can be set by the OLT 100.

Further, the optical signal reception unit 573 can include a variable wavelength filter 579. The variable wavelength filter 579 may be omitted based on the design. The variable wavelength filter 579 will be described below.

The multiplexing/demultiplexing unit 575 multiplexes/demultiplexes uplink optical signals and downlink optical signals. The multiplexing/demultiplexing unit 575 includes an arbitrary suitable multiplexer/demultiplexer, such as a WDM filter, for example. As already described above, in the present embodiment, light in the $\lambda 1$ to $\lambda 4$ wavelength bands is used for the downlink optical signals, and light in the $\lambda 1+n\lambda_{FSR}$ to $\lambda 4+n\lambda_{FSR}$ wavelength bands is used for the uplink optical signals. Consequently, by utilizing a WDN filter for example, uplink optical signals and downlink optical signals can be multiplexed and demultiplexed.

Next, with reference to FIG. 1, the path of a downlink optical signal transmitted from an OLT 100 to an ONU 500 and the path of an uplink optical signal from an ONU 500 to an OLT 100 will be described.

A downlink data signal transmitted from a higher network is input to the switching element 110. The switching element 110 transmits the downlink data signal to an OLT 100 according to the address based on the transmission plan received from the management unit 130. The OLT 100 converts the received downlink data signal into a downlink optical signal with a wavelength based on the wavelength setting signal received from the management unit 130. The downlink optical signal is transmitted from the OLT 100 to an optical line port 220 of the optical routing unit 200 via the optical transmission path 600. The optical routing unit 200 outputs a downlink optical signal from an optical network port 230 determined based on the wavelength of the downlink optical signal to each optical line port 220. The downlink optical signal output from the optical network port 230 is transmitted to an ONU 500 via the optical transmission path 700 of the branches 300.

On the other hand, an uplink optical signal transmitted from an ONU 500 is input to an optical network port 230 of the optical routing unit 200 via the optical transmission path 700. The optical routing unit 200 outputs a downlink optical signal from an optical line port 220 determined based on the wavelength of the uplink optical signal to each optical network port 230. The uplink optical signal output from the optical line port 220 is transmitted to the OLT 100 via the optical transmission path 600. The OLTs 100 and the ONUs 500 are linked on a one-to-one basis. The ONU 500 transmits an uplink optical signal to the OLT, which is the transmission source of the downlink optical signal.

(Optical Network Unit Registration Method)

Figure 5:
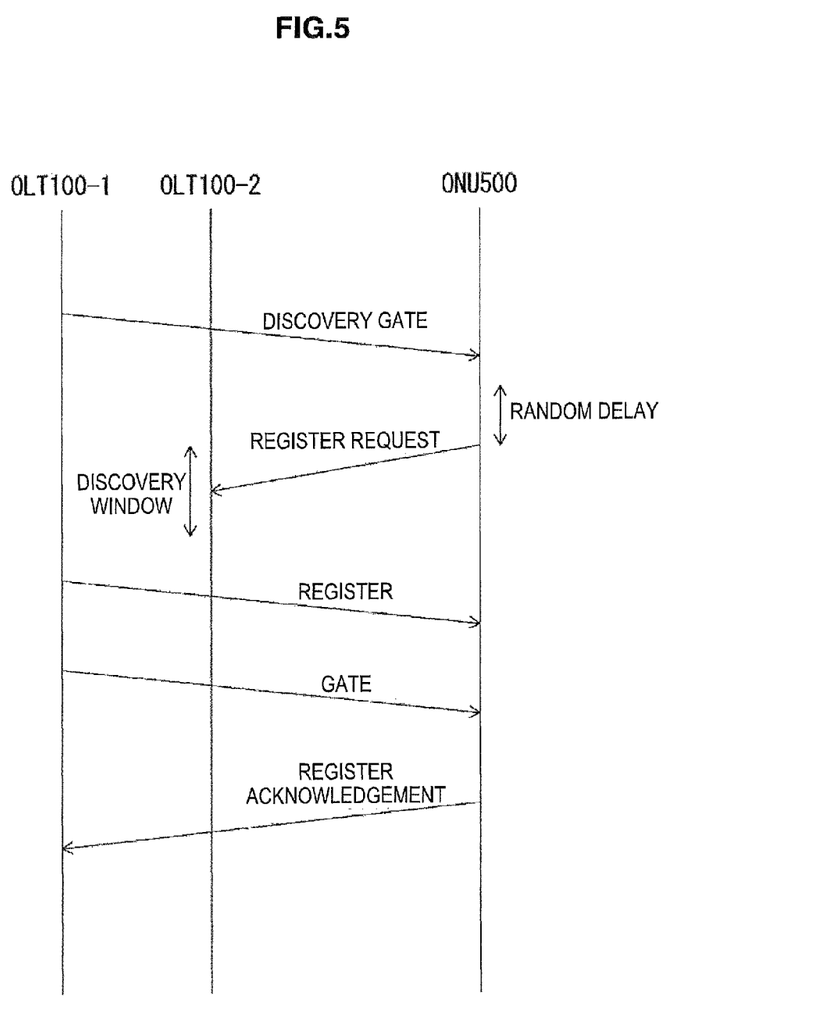
FIG. 5 is a sequence diagram illustrating an optical network unit registration method.

The optical network unit registration method according to the present embodiment will now be described with reference to FIG. 5. Here, a case is described in which the optical network unit registration method is applied in the above-described standard discovery sequence.

A discovery sequence is performed when, for example, an unregistered ONU is connected to the network and started up. Further, when rebooting an already-registered registered ONU, this ONU become unregistered, and is thus re-registered according to the discovery sequence.

Here, a discovery sequence between two OLTs (first and second OLTs) 100-1 and 100-2 of the plurality of OLTs and the branches 300 will be described.

First, the first OLT 100-1 transmits a response request signal (here, a discovery gate) to the ONUs 500.

The discovery gate is generated as a downlink control signal by the signal generation unit 163 of the first OLT 100-1. This downlink control signal includes information instructing the transmission timing and the transmission wavelength of the response signal (here, a register request) to the ONUs 500. The downlink control signal is converted into a downlink optical signal by the electrical signal transmission unit 157 and the optical signal transmission unit 171, and is then transmitted to the optical routing unit 200 via the multiplexing/demultiplexing unit 175.

As described above, the wavelength of the downlink optical signal is set based on the branch 300 of the transmission destination. Therefore, the management unit 130 transmits a wavelength setting signal instructing the setting of the determined wavelength to the branch 300 of the transmission destination. The downlink optical signal is generated according to the wavelength based on the wavelength setting signal.

Further, in the present embodiment, in the following process, for example, a register request from an unregistered ONU 500 is received by the OLTs that have a low communication amount or are not performing communication (including those in sleep mode). Therefore, the management unit 130 selects an OLT (here, the second OLT) 100-2 that has a low communication amount or is not performing communication. Further, the management unit 130 notifies the control unit 161 of the first OLT 100-1 so that a register request is transmitted to the second OLT 100-2. Consequently, the signal generation unit 163 sets the transmission wavelength of the register request instructed by the discovery gate to the value that the register request is to be transmitted at to the second OLT 100-2. Further, the management unit 130 transmits an instruction to the second OLT 100-2 to start a response reception expectation period (here, a discovery window).

The discovery gate transmitted as a downlink optical signal from the first OLT 100-1 is transmitted to the ONUs 500 via the optical routing unit 200.

Next, the unregistered ONU 500 transmits a register request requesting registration to the second OLT 100-2 as a response to the discovery gate.

In the unregistered ONU 500, the downlink optical signal as a discovery gate is transmitted to the optical signal reception unit 573 via the multiplexing/demultiplexing unit 575. The optical signal reception unit 573 converts the downlink optical signal into a downlink electrical signal. The converted downlink electrical signal is transmitted to the electrical signal reception unit 559. The electrical signal reception unit 559 restores the downlink electrical signal into a downlink control signal. The restored downlink control signal is transmitted to the control unit 561.

The control unit 561 reads with the signal reading unit 563 information instructing the transmission timing and the transmission wavelength of the register request included in the downlink control signal. The transmission setting unit 566 inserts a random delay and sets the transmission timing based on the transmission timing of the read register request. Then, the transmission setting unit 566 notifies the optical signal transmission unit 571 of the set transmission timing. Further, the transmission setting unit 566 notifies the optical signal transmission unit 571 of the transmission wavelength read by the signal reading unit 563. As already described above, the transmission wavelength of the register request is set to a value for transmission to the second OLT 100-2.

Further, the control unit 561 generates a register request with the signal generation unit 565. The register request includes a MAC address as an ONU individual identification number. An uplink control signal is transmitted to the electrical signal transmission unit 557. The electrical signal transmission unit 557 generates an uplink electrical signal based on the uplink control signal, and transmits the generated uplink electrical signal to the optical signal transmission unit 571. The optical signal transmission unit 571 converts the uplink electrical signal into an uplink optical signal. The uplink optical signal is generated based on the transmission wavelength notified from the control unit 561. The uplink optical signal is transmitted from the optical signal transmission unit 571 at the transmission timing notified from the control unit 561. The uplink optical signal is transmitted to the second OLT 100-2 via the multiplexing/demultiplexing unit 575 and the optical routing unit 200.

Next, the second OLT 100-2 receives the register request transmitted from the unregistered ONU 500.

As already described above, the second OLT 100-2 is an OLT 100 selected by the management unit 130 that has a low communication amount or is not performing communication. Further, it is preferred that the second OLT 100-2 is an OLT 100 whose communication amount is at least less than that of the OLT (here, the first OLT) 100-1 that transmitted the discovery gate.

A discovery window is set in the second OLT 100-2 based on an instruction from the management unit 130. During the period that this discovery window is open, the second OLT 100-2 waits for reception of a register request from the ONUs 500. Further, the magnitude of a random delay set by the ONUs 500 is set so that reception of the register request by the second OLT 100-2 is within the range that the discovery window is open.

At the second OLT 100-2, an uplink optical signal as a register request is transmitted to the optical signal reception unit 173 via the multiplexing/demultiplexing unit 175. The optical signal reception unit 173 converts the uplink optical signal into an uplink electrical signal. The converted uplink electrical signal is transmitted to the electrical signal reception unit 159. The electrical signal reception unit 159 restores the uplink electrical signal into an uplink control signal. The restored uplink control signal is transmitted to the control unit 161.

The control unit 161 reads the MAC address included in the uplink control signal with the signal reading unit 165. The MAC address is notified to the management unit 130.

The management unit 130 notifies the first OLT 100-1 of the MAC address notified from the second OLT 100-2.

Next, the first OLT 100-1 notifies the ONU 500 having the above-described MAC address of the register including an LLID, the transmission bandwidth, and the transmission timing, and sequentially transmits a gate that permits uplink optical signal transmission. The ONU 500 that received the gate transmits a register acknowledgement to the first OLT 100-1. When the first OLT 100-1 receives the register acknowledgement, the registration of the ONU 500 in the first OLT 100-1 is complete. Then, the ONU registration unit 167 of the first OLT 100-1 transmits the registered information to the management unit 130.

Although an example was described here in which the first OLT 100-1 performed the transmission of the register and the gate, and the reception of the register acknowledgement, in the optical network unit registration method according to the present embodiment, the transmission and reception of the register, gate, and register acknowledgement can also be performed by the second OLT 100-2. In this case, the unregistered ONU 500 is registered in the second OLT 100-2.

Thus, in the optical network unit registration method according to the present embodiment, a discovery window is set in a separate OLT (here, the second OLT) 100-2 to the OLT (here, the first OLT) 100-1 that transmits the discovery gate, and the register request is received during this discovery window. Consequently, a discovery window is not set in the first OLT 100-1. Therefore, the first OLT 100-1 can receive an uplink optical signal without stopping communication even after transmission of the discovery gate. As a result, the discovery sequence can be carried out without a deterioration in communication efficiency between the first OLT 100-1 and the respective ONUs 500. Especially, by selecting as the OLT to receive the register request the second OLT 100-2 that, until the discovery sequence start point, has had a lower communication amount than the first OLT 100-1 transmitting the discovery gate, or has not been performing communication, deterioration in communication efficiency for the overall TDM/WDM-PON 10 can be suppressed.

(Branch Specification Method)

As illustrated in FIG. 1, the TDM/WDM-PON 10 includes a plurality of branches 300-1 to 300-4.

In the discovery sequence in the TDM/WDM-PON 10, the OLT 100 should specify which of the branches 300 the ONU 500 that transmitted the register request is included on. Further, the OLT 100 also should set the wavelength of the downlink optical signal transmitted in the discovery sequence after reception of the register request based on the branch 300 that the ONU 500 belongs to.

Figure 6:
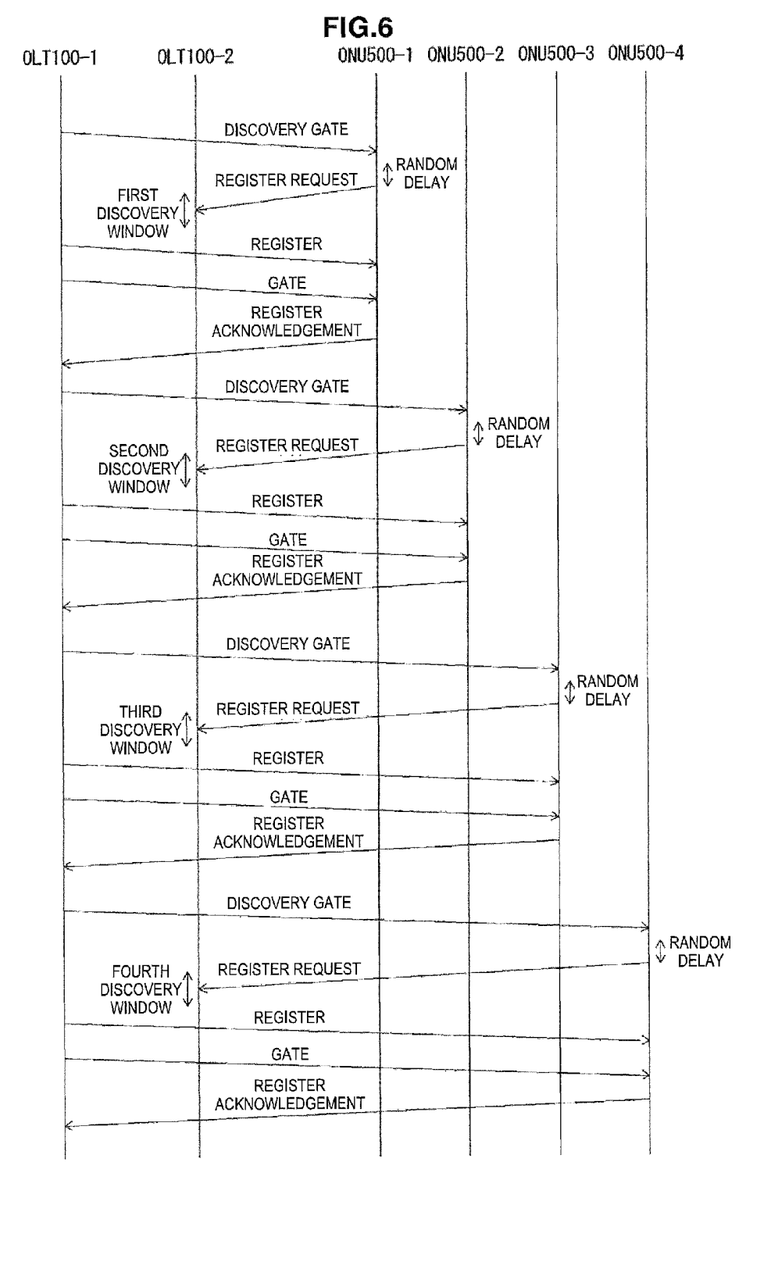
FIG. 6 is a sequence diagram illustrating an optical network unit registration method.

Accordingly, the method for specifying the branch 300 that the unregistered ONU 500 belongs to in the optical network unit registration method according to the present embodiment will now be described with reference to FIG. 6.

First, the first OLT 100-1 transmits a discovery gate to each of the ONUs 500-1 belonging to one branch (here, a first branch) 300-1.

The management unit notifies the second OLT 100-2 that the first OLT 100-1 is to transmit a discovery gate to each ONU 500-1 belonging to the first branch 300-1.

Next, an unregistered ONU 500-1 belonging to the first branch 300-1 transmits a register request requesting registration to the second OLT 100-2 as a response to the discovery gate.

Next, the second OLT 100-2 receives the register request transmitted from the unregistered ONU 500-1.

A first discovery window is set by the second OLT 100-2. During the period that this first discovery window is open, the second OLT 100-2 waits for reception of a register request from the ONU 500-1 included on the first branch 300-1. The magnitude of a random delay set by the ONU 500-1 is set so that reception of the register request by the second OLT 100-2 is within the range that the first discovery window is open.

The second OLT 100-2 reads the MAC address from the register request with the signal reading unit 165 of the control unit 161. As described above, the first OLT 100-1 is transmitting a discovery gate to only the first branch 300-1. Further, the second OLT 100-2 is notified from the management unit 130 of the fact that a discovery gate was transmitted to the first branch 300-1. Consequently, the signal reading unit 165 can specify that the ONU 500-1 having the read MAC address belongs to the first branch 300-1. After branch specification, the control unit 161 notifies the management unit 130 of the first branch 300-1 that the ONU 500-1 currently in the discovery sequence belongs to. The management unit 130 sets the wavelength so that even in the subsequent steps in the discovery sequence the downlink optical signal is transmitted to only the first branch 300-1 that the unregistered ONU 500-1 belongs to. Further, the set wavelength is instructed to the optical signal transmission unit 171 of the first OLT 100-1 by a wavelength setting signal.

The subsequent processes are the same as in the above-described optical network unit registration method. Specifically, the first OLT 100-1 notifies the ONU 500-1 of the register including an LLID, the transmission bandwidth, and the transmission timing, and sequentially transmits a gate that permits uplink optical signal transmission. The ONU 500-1 that received the gate transmits a register acknowledgement to the first OLT 100-1. When the first OLT 100-1 receives the register acknowledgement, the registration of the ONU 500-1 in the first OLT 100-1 is complete. Then, the ONU registration unit 167 of the first OLT 100-1 transmits the registered information to the management unit 130.

As already described above, although an example was described here in which the first OLT 100-1 performed the transmission of the register and the gate, and the reception of the register acknowledgement, in the optical network unit registration method according to the present embodiment, the transmission and reception of the register, gate, and register acknowledgement can also be performed by the second OLT 100-2. In this case, the unregistered ONU 500-1 is registered in the second OLT 100-2.

The above-described process is then carried out on each of the branches 300-1 to 300-4, respectively. In the present embodiment, the TDM/WDM-PON 10 includes four branches 300-1 to 300-4. Consequently, as illustrated in FIG. 6, after the registration of the ONU 500-1 belonging to the first branch 300-1 is finished, unregistered ONUs 500-2 to 500-4 belonging to branches 300-2 to 300-4 are sequentially registered based on the same process. The management unit 130 switches the respectively determined wavelength of the downlink optical signal for each of the branches 300 that is the target of the discovery sequence. Further, the uplink optical signal wavelength to be set is instructed to the optical signal transmission unit 171 by a wavelength setting signal.

By completing the registration of all the branches 300-1 to 300-4, the discovery sequence is finished. The ONU registration unit 167 of the control unit 161 registers the branches 300 registered in that discovery sequence, namely, the branches 300 to which ONUs 500 for which a PON link has been newly established belong to. Then, the ONU registration unit 167 transmits the registered information to the management unit 130. Based on this information, the management unit 130 sets the wavelength for the downlink optical signal to the ONUs 500-1 to 500-4 subsequently performed based on normal communication.

Thus, in the above-described branch specification method, during a discovery window set for each branch 300, the second OLT 100-2 receives a register request from an unregistered ONU 500 belonging to a corresponding branch 300. As a result, the second OLT 100-2 can specify which of the branches 300 the unregistered ONU 500 belongs to. Consequently, the OLT 100 can set the wavelength of the downlink optical signal transmitted by the first OLT 100-1 or the second OLT 100-2 in the discovery sequence after reception of the register request based on the branches 300.

Here, in this optical network unit registration method, the method for specifying the branches is not limited to the example described above.

For example, the first OLT 100-1 can also transmit a discovery gate to a ONU 500 belonging to a plurality of branches 300. In this case, an unregistered ONU 500 transmits a register request to the second OLT 100-2 at a timing that is different for each branch and that is instructed by the discovery gate. Further, during a discovery window sequentially set for each branch, the second OLT 100-2 receives a register request from an unregistered ONU 500 belonging to a corresponding branch 300. The second OLT 100-2 can specify the branch 300 to which the unregistered ONU 500 that transmitted the register request belongs to based on which discovery window the register request was received in.

Further, in this optical network unit registration method, as a separate method for specifying a branch, the first OLT 100-1 can also generate a discovery gate that includes an identification symbol (branch ID) determined for each branch 300, and transmit that generated discovery gate to the ONUs 500. In this case, an unregistered ONU 500 transmits a register request including the branch ID read from the discovery gate to the second OLT 100-2. The second OLT 100-2 reads the branch ID from the received register request, and can thereby specify the branch 300 to which the unregistered ONU 500 that transmitted the register request belongs to.

(Modified Example of Optical Network Unit Registration Method)

Figure 7:
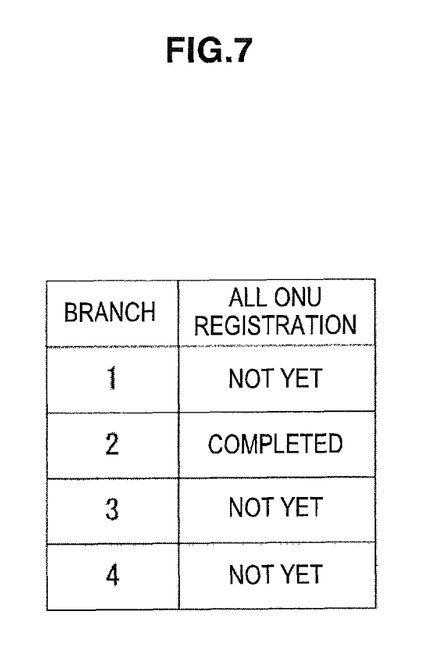
FIG. 7 illustrates an example of an ONU registration state table.

A modified example of an optical network unit registration method will now be described with reference to FIG. 7.

Here, a discovery sequence between two OLTs (here, a first and a second OLT) 100-1 among the plurality of OLTs and branches 300-1 to 300-4 will be described.

In this modified example, in the above-described optical network unit registration method, the first OLT 100-1 excludes branches 300 on which only registered ONUs 500 belong from being a discovery sequence target.

Therefore, before performing the discovery sequence according to the above-described optical network unit registration method, first, in the first OLT 100-1, the branch state management unit 169 of the control unit 161 reads the registration state of the ONUs 500 belonging to each of the branches 300. This registration state is stored in the above-described storage unit (not illustrated).

The branch state management unit 169 manages the registration state of the ONUs 500 included on the branches (here, the first to fourth branches) 300-1 to 300-4 managed by the first OLT 100-1. FIG. 7 illustrates an example of an ONU 500 registration state table read by the branch state management unit 169 from the storage unit. In the example illustrated in FIG. 7, among the branches 300-1 to 300-4 managed by the first OLT 100-1, all of the ONUs 500-2 included on the second branch 300-2 are registered in the OLT-1. Namely, on the second branch 300-2, all the ONUs 500 that can be included on this second branch 300-2 are registered in the first OLT 100-1. Further, the other branches 300-2, 300-3, and 300-4 have not reached their respective allowance for the number of registered ONUs 500.

Next, the first OLT 100-1 determines the branch 300 on which to perform the discovery sequence based on the registration state of the ONUs 500 with the branch state management unit 169. Here, the branch 300-2, whose ONUs 500-2 have all been registered, is excluded from being a target of the discovery sequence. Therefore, the first OLT 100-1 does not transmit a discovery gate to the second branch 300-2. Further, based on the determination result, a discovery gate is transmitted to the branches (here, the first, third, and fourth branches) 300-1, 300-3, and 300-4 that are the target of the discovery sequence, and the discovery sequence is started. The discovery sequence is the same as in the optical network unit registration method described above.

As already described above, when the discovery sequence finishes, the ONU registration unit 167 of the control unit 161 registers the branches 300 registered in that discovery sequence, namely, the branches 300 on which ONUs 500 for which a PON link has been newly established belong. In this modified example, the information registered in the ONU registration unit 167 is transmitted to the branch state management unit 169. Then, if there is now a new branch 300 that has all of its ONUs 500 registered, the branch state management unit 169 updates the above registration state table (FIG. 7).

Thus, in this modified example of the optical network unit registration method, among the respective branches 300-1 to 300-4, the first OLT 100-1 excludes branches 300 that only have registered ONUs 500 belonging to them, and does not transmit a discovery gate to those branches. Consequently, the discovery sequence can be finished in a shorter time.

In the TDM/WDM-PON 10, if there is a plurality of OLTs 100 connected to a plurality of branches 300, it may be necessary to prevent a discovery gate transmitted from a given OLT 100 from interfering with the downlink optical signals transmitted from the other OLTs 100.

Accordingly, to prevent such interference, the management unit 130 manages the transmission timing of the downlink optical signals from each OLT 100. Further, the management unit 130 sets a discovery sequence period.

Specifically, the management unit 130 transmits a discovery gate transmission signal to one OLT 100. The OLT 100 that received the discovery gate transmission signal transmits a discovery gate to the ONUs 500, and starts the above-described discovery sequence. After the discovery gate is transmitted, the OLT 100 transmits a discovery gate transmission completion signal to the management unit 130.

Further, the management unit 130 issues a downlink optical signal stop instruction to the other OLTs 100 when the discovery gate transmission signal is transmitted. The OLTs 100 that receive the downlink optical signal stop instruction stop transmission of downlink optical signals to the ONUs 500. After the discovery gate transmission completion signal is received, the main body control unit 120 issues a downlink optical signal restart instruction to the OLTs 100 that had stopped downlink optical signal transmission. The OLTs 100 that receive the downlink optical signal restart instruction restart transmission of downlink optical signals to the ONUs 500.

Thus, when one OLT 100 transmits a discovery gate, by stopping transmission of downlink optical signals by the other OLTs 100, interference between the discovery gate and the other downlink optical signals can be prevented.

In addition, the management unit 130 makes each of the OLTs 100-1 to 100-4 sequentially perform the discovery sequence, for example, based on an arbitrarily and suitably set discovery sequence period. Consequently, interference in the discovery sequence of the respective OLTs 100 can be prevented.

Further, if a plurality of OLTs 100 are managing the same branch 300 in a duplicatve manner, one ONU 500 may receive a downlink optical signal from different OLTs 100. To prevent this, the above-described variable wavelength filter 579 can be utilized.

If a variable wavelength filter 579 is provided in the optical signal reception unit 573 of the ONUs 500, the downlink optical signals are transmitted to the photoelectric conversion element 577 via the variable wavelength filter 579.

In the variable wavelength filter 579, a passband is set that allows only downlink optical signals having a specific wavelength to pass. In the present embodiment, the TDM/WDM-PON 10 includes four OLTs 100-1 to 100-4, and the ONUs 500 receive downlink optical signals having any one of wavelengths $\lambda 1$, $\lambda 2$, $\lambda 3$, or $\lambda 4$ (refer to FIG. 2). Thus, the variable wavelength filter 579 passband is set to any of the wavelengths $\lambda 1$, $\lambda 2$, $\lambda 3$, or $\lambda 4$. Consequently, only a downlink optical signal from a desired OLT 100 can be received.

If the variable wavelength filter 579 is provided, downlink optical signals other than the downlink optical signal having the set wavelength cannot be received. Therefore, in the discovery sequence, the discovery gate from the OLT 100 might not be received. Accordingly, the variable wavelength filter 579 sequentially switches the passband based on the wavelength $\lambda 1$, $\lambda 2$, $\lambda 3$, and $\lambda 4$ by receiving a passband switch signal that is transmitted at a fixed period from the control unit 561. Consequently, the ONUs 500 are in a state where they can sequentially receive a downlink optical signal from the respective OLTs 100. For example, the band of a downlink optical signal allowed to pass by the variable wavelength filter 579 is switched by synchronizing with the discovery sequence period of a specific OLT (e.g., first OLT) 100-1. In this case, at a given timing, when a downlink optical signal transmitted from the first OLT 100-1 passes through the variable wavelength filter 579, the ONUs 500 can receive a discovery gate from the first OLT 100-1.

What is claimed is:

1. An optical network unit registration method for registering an unregistered optical network unit in a network that includes
    a plurality of optical line terminals;
    a plurality of branches, each of which includes a branched optical transmission path and at least one optical network unit connected to a respective branch destination of the optical transmission path, the unregistered optical network unit being among the optical network units of the plurality of branches; and
    an optical routing unit, which has a plurality of optical communication ports that are divided into a first group connected to the plurality of optical line terminals and a second group connected to the optical transmission paths of the plurality of branches, and which is configured to output an optical signal input to an optical communication port of one of the groups from an optical communication port of the other group, which is determined based on a wavelength of the optical signal,
    the optical network unit registration method comprising:
    a first process in which one of the plurality of optical line terminals transmits a downlink optical signal to the optical network units; and
    a second process in which, in response to the downlink optical signal, the unregistered optical network unit transmits an uplink optical signal to an optical line terminal other than the optical line terminal that transmitted the downlink optical signal, wherein
        in the first process the one optical line terminal transmits a response request signal as the downlink optical signal,
        in the second process the unregistered optical network unit transmits a response signal as the uplink optical signal, a response reception expectation period is set in the optical line terminal receiving the response signal, and the other optical line terminal receives the response signal during the response reception expectation period, and
        the response request signal is not transmitted to any branch among said plurality of branches, of which every optical network unit is registered.

2. An optical network unit registration method for registering an unregistered optical network unit in a network that includes
    a plurality of optical line terminals;
    a plurality of branches, each of which includes a branched optical transmission path and a respective optical network unit connected to at least one branch destination thereof, the unregistered optical network unit being among the optical network units of the plurality of branches; and an optical routing unit, which has a plurality of optical communication ports that are divided into a first group connected to the plurality of optical line terminals and a second group connected to the optical transmission paths of the plurality of branches, and which is configured to output an optical signal input to an optical communication port of one of the groups from an optical communication port of the other group that is determined based on a wavelength of the optical signal, the optical network unit registration method comprising:

a first process in which one of the plurality of optical line terminals transmits a downlink optical signal to the optical network units; and a second process in which, in response to the downlink optical signal, the unregistered optical network unit transmits an uplink optical signal to an optical line terminal of said plurality of optical line terminals other than the one optical line terminal that transmitted the downlink optical signal, wherein in the first process the one optical line terminal transmits a response request signal as the downlink optical signal while the others of said plurality of optical line terminals do not transmit a downlink optical signal to the optical network units, and in the second process the unregistered optical network unit transmits a response signal as the uplink optical signal, a response reception expectation period is set in the optical line terminal receiving the response signal, the receiving optical line terminal receiving the response signal during the response reception expectation period.

3. The optical network unit registration method according to claim 1, wherein the response request signal is not transmitted to a branch among said plurality of branches of which every optical network unit is registered.

4. The optical network unit registration method according to claim 2, wherein the network further comprises a management unit for managing a communication in the network, and wherein the first process further comprises receiving by said others of said plurality of optical line terminals a control signal from the management unit, in response to which said others of said plurality of optical line terminals refrain from transmitting any downlink optical signals to the optical network units.

5. The optical network unit registration method according to claim 2, wherein the control signal is a stop transmitting signal.

* * * * *